Sept. 30, 1952     C. H. SCHETZER     2,612,060
ACCELERATOR FOOTREST FOR AUTOMOTIVE VEHICLES
Filed Jan. 20, 1950
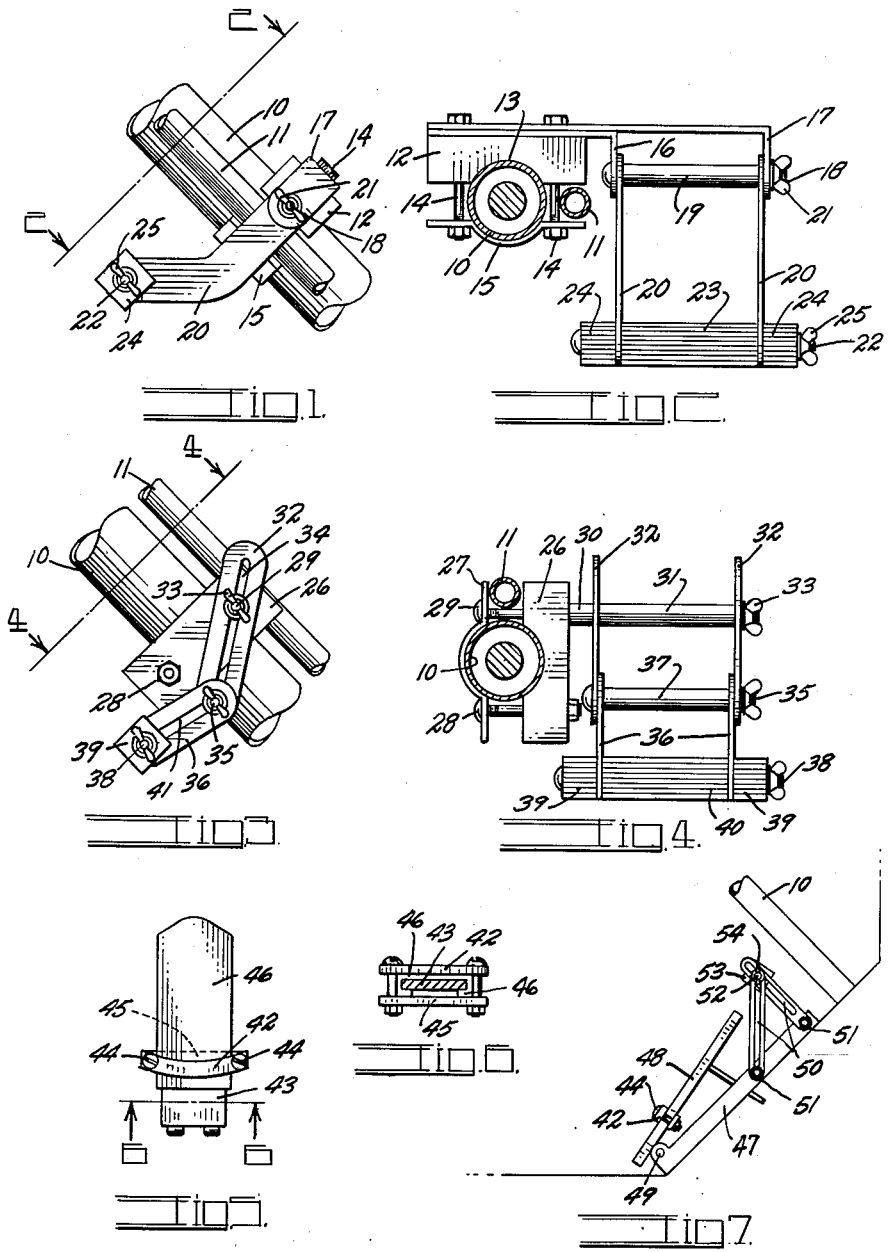
INVENTOR.
CHARLES H. SCHETZER
BY
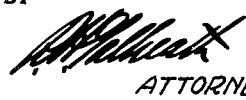
ATTORNEY Patented Sept. 30, 1952

2,612,060

UNITED STATES PATENT OFFICE 2,612,060

ACCELERATOR FOOTREST FOR AUTOMOTIVE VEHICLES

Charles H. Schetzer, Goodland, Kans.

Application January 20, 1950, Serial No. 139,676

3 Claims. (Cl. 74—564)

This invention relates to a fatigue preventing foot rest for automotive vehicles. The usual automotive vehicle is controlled by means of an accelerator pedal which must be maintained depressed during all driving periods. Upon long tours the foot of the driver becomes exceedingly fatigued from constantly holding the accelerator pedal in the proper operating position.

The principal object of this invention is to provide an economical, highly efficient, easily installed foot rest which can be placed adjacent the accelerator pedal of an automotive vehicle to support the driver's foot and to relieve tiresome strain upon the foot and leg muscles.

Another object of the invention is to so construct the device that it can be readily installed on any conventional automotive vehicle without requiring the drilling of holes or otherwise changing or marring the vehicle.

A further object is to provide a foot cushion which may easily be slipped over the conventional accelerator pedal to cushion the foot from engine and road vibrations.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of one embodiment of the improved foot rest, illustrating it attached to the steering wheel post of an automotive vehicle;

Fig. 2 is a cross-section through the wheel post of Fig. 1, taken on the line 2—2, Fig. 1;

Fig. 3 is a similar side view, illustrating an alternate form of the improved foot rest;

Fig. 4 is a section similar to Fig. 2, taken on the line 4—4, Fig. 3;

Fig. 5 illustrates an accelerator pedal pad and heel rest employed with the improved foot rest;

Fig. 6 is a cross-section through the pedal of Fig. 5, taken on the line 6—6, Fig. 5; and Fig. 7 is a side view of an alternate form of the improved accelerator foot rest.

In the drawing, a conventional steering wheel column is indicated at 10, with the usual gear shift shaft at 11.

The preferred embodiment of the invention comprises an attachment block 12 provided with an arcuate notch 13 in its lower edge to receive one side of the column 10. The block 12 is drilled to receive two clamp bolts 14 which serve to hold an arcuately bent clamping plate 15 against the opposite side of the steering column 10. It will be noted that one of the bolts 14 passes between the steering column 10 and the gear shift shaft 11. The bolts 14 serve to hold two angle brackets 16 and 17 in place on the block 12. The angle bracket 16 is shorter than the angle bracket 17 so that their two angularly turned extremities are spaced apart at the right side of the steering column 10.

A clamping bolt 18 extends between the spaced-apart extremities of the brackets 16 and 17 through a spacing sleeve 19 positioned therebetween. A supporting arm 20 is clamped in place by each extremity of the spacing sleeve 19 when a wing nut 21 is tightened on the bolt 18. The arms 20 are bent upwardly at their outer extremities and receive a foot rest bolt 22.

The foot rest bolt 22 extends through a middle rectangular, rubber foot rest pad 23 positioned between the arms 20 and through two similar outside foot rest pads 24 positioned outside of each of the arms 20. The pads 23 and 24 are clamped in any desired position by tightening a wing nut 25 on the bolt 22.

In the usual automotive vehicle the accelerator pedal is positioned adjacent and to the right of the steering column 10. It can be seen that the improved foot rest will also be positioned adjacent to and to the right of the column 10 above and forwardly of the standard accelerator pedal so that the driver can rest the ball of his foot on the pads 23 and 24, allowing the heel of his foot to depress the accelerator pedal so as to relieve the strain occasioned by the constant toe pressure thereon.

In Figs. 3 and 4 a second embodiment of the invention is illustrated, constructed very similarly to the form of Figs. 1 and 2. It also employs a clamping block 26 and a clamping plate 27 having arcuate depressions for receiving the steering column 10. In this case, however, a relatively short bolt 28 is employed at one side of the column, and a long bolt 29 is employed at the other side thereof. The long bolt extends through a short spacing sleeve 30, a long spacing sleeve 31, and through two slotted arms 32.

The entire assembly is clamped together in any desired position by means of a wing clamp nut 33. The arms 32 are provided with medial slots 34 which allow them to be adjusted at any desired longitudinal position with reference to the bolt 29. The extremities of the arms 32 terminate in an elbow bolt 35 by means of which two slotted links 36 are clamped against the extremities of a clamping sleeve 37.

The links 36 terminate in a foot rest bolt 38 which clamps two short pedal pads 39 and a long pedal pad 40 in place, similarly to the pedal pads 23 and 24, previously described. It will be noted that the links 36 contain longitudinal slots 41 which allow the relative spacing between the pedal pads and the elbow bolt 35 to be adjusted to suit encountered positions of accelerator pedals.

It will be noted that the form of Figs. 3 and 4 can be used on automotive vehicles in which the gear shift shaft 11 is positioned forwardly of the steering post 10 without changing the construction of the blocks 12 and 26 or the clamping strips 15 and 27. The purpose of the second form is similar to the previously described form.

Both forms of the invention are used in connection with a heel rest bar 42 adapted to be clamped across the accelerator pedal, indicated at 43, by means of clamp screws 44 and a clamp strap 45. The clamp strap 45 extends across beneath the pedal 43, and the heel rest bar 42 extends across the top thereof in gripping relation thereon. The bar 42 is positioned on the pedal to conveniently support the driver's heel when the ball of his foot is resting upon one of the foot rests of the previous figures.

A slipover, resilient foot cushion 46 is provided formed of relatively soft, thick rubber. The foot cushion 46 is so constructed that it may be slipped over and around the edges of the accelerator pedal 43, as shown in Figs. 5 and 6, to still further relieve the muscular fatigue from vibrations transmitted to the driver's accelerator foot. The foot rest cushion is secured in place by means of the bar 42 and the clamping strap 45.

In Fig. 7 a third form of foot rest is illustrated, comprising a base member 47 to which an accelerator pedal 48 is hinged at 49. The accelerator pedal 48 replaces the conventional pedal of the automotive vehicle. A pair of slotted brace links 50 are mounted on clamp bolts 51 at each side of the base 47 to support a foot rest bolt 52 carrying a foot rest member 53 similar to the foot rest pad 23 of the previous form.

It can be seen that by loosening a wing nut 54 the bolt 52 can be moved forwardly and backwardly, upwardly and downwardly, until the most comfortable position for the pad 53 is located. The wing nut can then be tightened to support the pad in the selected position. The accelerator pedal 48 carries the heel rest bar 42 similarly to the previously described forms.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. Means for supporting a foot rest from the steering column of an automotive vehicle comprising: an attachment block adapted to contact one side of said column; an attachment strap adapted to receive the other side of said column; clamp bolts drawing said block and said strap against said column; a relatively long bolt extending from said block; a spacing sleeve surrounding said bolt; an arm adapted to be clamped at each extremity of said spacing sleeve by the action of said bolt; a foot rest member supported between the outer extremities of said arms; a hinge in said arms allowing the outer extremities to be swung at an angle to the inner extremities thereof; and means for clamping said hinge at any desired angular position.

2. Means for supporting a foot rest from the steering column of an automotive vehicle comprising: an attachment block adapted to contact one side of said column; an attachment strap adapted to receive the other side of said column; a pair of clamping bolts extending between said block and said strap and acting to clamp the latter two members on said column; a short angle bracket member; a long angle bracket member, said two bracket members being clamped to said attachment block by said clamping bolts; angularly turned extremities on said bracket members; a third bolt extending between the angularly turned extremities of said bracket member; a spacing sleeve surrounding said third bolt; an arm extending from said third bolt at each extremity of said spacing sleeve and adapted to be clamped between said sleeve and the adjacent bracket member by tightening said third bolt; a foot rest bolt extending between the outer extremities of said arms; and a resilient foot rest member surrounding said foot rest bolt between said arms.

3. Means for supporting a foot rest from the steering column of an automotive vehicle comprising: an attachment block adapted to contact one side of said column; an attachment strap adapted to receive the other side of said column; clamp bolts drawing said block and said strap against said column; a relatively long bolt extending from said block; a spacing sleeve surrounding said bolt; an arm adapted to be clamped at each extremity of said spacing sleeve by the action of said bolt; and a foot rest member supported between the outer extremities of said arms.

CHARLES H. SCHETZER.

REFERENCES CITED

The following references are of record in the file of this patent:

UNITED STATES PATENTS

| Number | Name | Date |
| --- | --- | --- |
| 1,489,634 | Fetzer | Apr. 8, 1924 |
| 1,613,237 | Meyer | Jan. 4, 1927 |
| 1,706,003 | Swain | Mar. 19, 1929 |
| 1,895,986 | Grant | Jan. 31, 1933 |
| 1,898,640 | Moss | Feb. 21, 1933 |